US009599045B2

(12) United States Patent
Touchette et al.

(10) Patent No.: US 9,599,045 B2
(45) Date of Patent: Mar. 21, 2017

(54) METHOD AND APPARATUS FOR CONTROLLING FUEL PRESSURE IN A GASEOUS FUELLED INTERNAL COMBUSTION ENGINE

(71) Applicant: Westport Power Inc., Vancouver (CA)

(72) Inventors: Alain M. J. Touchette, Vancouver (CA); Jamie Y. Wardlaw, Squamish (CA)

(73) Assignee: WESTPORT POWER INC., Vancouver (CA)

( * ) Notice: Subject to any disclaimer, the term of this patent is extended or adjusted under 35 U.S.C. 154(b) by 226 days.

(21) Appl. No.: 14/504,240

(22) Filed: Oct. 1, 2014

(65) Prior Publication Data

US 2015/0075499 A1  Mar. 19, 2015

Related U.S. Application Data

(63) Continuation of application No. PCT/CA2013/050268, filed on Apr. 3, 2013.

(30) Foreign Application Priority Data

Apr. 5, 2012  (CA) ..................... 2773651

(51) Int. Cl.
*F02D 19/06* (2006.01)
*F02D 41/00* (2006.01)
(Continued)

(52) U.S. Cl.
CPC ..... *F02D 41/0027* (2013.01); *F02D 19/0605* (2013.01); *F02D 19/0628* (2013.01);
(Continued)

(58) Field of Classification Search
CPC ............. F02D 19/0605; F02D 19/0642; F02D 19/0647; F02D 19/0694; F02D 19/081; F02D 41/0025; F02D 41/0027
(Continued)

(56) References Cited

U.S. PATENT DOCUMENTS 6,298,833 B1  10/2001  Douville et al.
6,336,598 B1  1/2002  Touchette et al.
(Continued)

FOREIGN PATENT DOCUMENTS

CA  2505455 A1  7/2005
CA  2532775 A1  4/2006
(Continued)

OTHER PUBLICATIONS

Search Report issued by EPO on Feb. 11, 2015 in connection with co-pending Europe Application No. 14003627.8.
(Continued)

*Primary Examiner* — Mahmoud Gimie
(74) *Attorney, Agent, or Firm* — Carie C. Mager; C. Larry Kyle (57) ABSTRACT

A method for controlling fuel pressure in an internal combustion engine consuming a gaseous fuel and a liquid fuel comprises steps of determining a gaseous fuel pressure target value as a function of an engine operating condition, pressurizing the liquid fuel to a liquid fuel pressure based on the gaseous fuel pressure target value, and regulating gaseous fuel pressure from the liquid fuel pressure. The gaseous fuel pressure equals the gaseous fuel pressure target value to within a predetermined range of tolerance. A corresponding apparatus controls fuel pressure in a gaseous fuelled internal combustion engine.

17 Claims, 6 Drawing Sheets

(51) Int. Cl.
*F02D 19/10* (2006.01)
*F02D 41/14* (2006.01)
*F02D 41/38* (2006.01)
*F02D 19/08* (2006.01)

(52) U.S. Cl.
CPC ..... *F02D 19/0642* (2013.01); *F02D 19/0678* (2013.01); *F02D 19/0694* (2013.01); *F02D 19/10* (2013.01); *F02D 41/1402* (2013.01); *F02D 41/1497* (2013.01); *F02D 41/38* (2013.01); *F02D 2041/389* (2013.01); *Y02T 10/36* (2013.01)

(58) Field of Classification Search
USPC ............ 123/525, 526, 575, 304, 495, 27 GE
See application file for complete search history.

(56) References Cited

U.S. PATENT DOCUMENTS

| | | |
|---|---|---|
| 7,308,889 B2 | 12/2007 | Post et al. |
| 2006/0213488 A1 | 9/2006 | Post et al. |
| 2008/0103676 A1 | 5/2008 | Ancimer et al. |
| 2013/0098333 A1 | 4/2013 | Kim et al. |

FOREIGN PATENT DOCUMENTS

| | | | |
|---|---|---|---|
| CA | 2538980 A1 | 8/2006 | |
| CN | 1422362 A | 6/2003 | |
| CN | 1701169 A | 11/2005 | |
| EP | 1546532 A1 | 6/2005 | |
| GB | 1370619 A | * 10/1974 | ......... F02D 19/0647 |
| GB | 2437098 A | 10/2007 | |
| WO | 0177513 A1 | 10/2001 | |
| WO | 2006122427 A1 | 11/2006 | |

OTHER PUBLICATIONS

Search Report issued by EPO on Mar. 24, 2016 in connection with co-pending Europe Application No. 13772534.7.
International Search Report and Written Opinion of the International Searching Authority issued on Jun. 6, 2013, in connection with International Application No. PCT/CA2013/050268.
International Preliminary Report on Patentability issued on Oct. 7, 2014, in connection with PCT/CA2013/050268.
Search Report mailed by SIPO on Jun. 27, 2016 in connection with co-pending Chinese Application No. 201380029587.2.

* cited by examiner

METHOD AND APPARATUS FOR CONTROLLING FUEL PRESSURE IN A GASEOUS FUELLED INTERNAL COMBUSTION ENGINE

CROSS-REFERENCE TO RELATED APPLICATIONS

This application is a continuation of International Application No. PCT/CA2013/050268 having an international filing date of Apr. 3, 2013, entitled "Method And Apparatus For Controlling Fuel Pressure In A Gaseous Fuelled Internal Combustion Engine". The '268 international application claimed priority benefits, in turn, from Canadian Patent No. 2,773,651 filed on Apr. 5, 2012. The '268 international application is hereby incorporated by reference herein in its entirety.

FIELD OF THE INVENTION

The present invention relates to a technique of controlling fuel pressure in a gaseous fuelled internal combustion engine. The technique involves determining a gaseous fuel pressure target value with respect to engine operating conditions and controlling a liquid fuel pumping apparatus based on the target value.

BACKGROUND OF THE INVENTION

Natural gas can be used in place of diesel for supplying a Diesel-cycle engine with fuel to obtain emission and economic benefits. In these engines it is known to use diesel as a pilot fuel since the auto-ignition temperature of natural gas is substantially greater than that of diesel. A small amount of diesel, normally about 5% of total fuel introduced to the combustion chamber, is injected along with natural gas, which is the main fuel. The diesel ignites due to compression heat and subsequently the natural gas is ignited due to the combustion of diesel.

A dual fuel injector separately injects two fuels into a combustion chamber of an internal combustion engine. In particular, the two fuels can be controlled quantities of a liquid pilot fuel, such as diesel, and a gaseous fuel such as natural gas. U.S. Pat. No. 6,336,598 (the '598 patent), issued Jan. 8, 2002, which is co-owned along with the present application by the Applicant, discloses such a dual fuel injector that is hydraulically actuated. The fuel injector comprises an injector body, and hydraulic fluid, liquid fuel and gaseous fuel inlet ports. The hydraulic fluid inlet port enables pressurized hydraulic fluid to be introduced into the interior of the injector body. A liquid seal in the injector inhibits or prevents leakage of high-pressure gaseous fuel into the hydraulic actuating fluid. The liquid seal is filled with the pressurized hydraulic fluid, which is substantially confined therein. The hydraulic fluid is of sufficient pressure to maintain sealing and to inhibit or prevent leakage of the gaseous fuel into the hydraulic fluid. In a preferred embodiment, the liquid pilot fuel and hydraulic fluid are the same and both are supplied to the dual fuel injector from the diesel common rail. When the pilot fuel is used for sealing, the gaseous fuel is pressurized to a pressure slightly less than that of the pilot fuel pressure to inhibit or prevent leakage of gaseous fuel past a fluid seal cavity in the injector.

As disclosed in U.S. Pat. No. 6,298,833 (the '833 patent), issued Oct. 9, 2001, which is also co-owned by the Applicant, it is known to dynamically control sealing-fluid pressure to ensure that gaseous fuel pressure is slightly less than pilot fuel pressure for all engine operating conditions. A pressure-balancing system, which includes a pressure-balancing device such as a dome-loaded regulator, reduces the pressure differential between the sealing-fluid (the pilot fuel) and the gaseous fuel used in the dual fuel injector. At the same time, the pressure balancing system dynamically balances the sealing-fluid pressure such that the gaseous fuel pressure is equal to or slightly less than the pressure of the pilot fuel within the injection valve. The pressure differential between the gaseous fuel and the pilot fuel can be maintained throughout the operating range of engine speeds, engine loads, and fuel cut-off conditions so as to inhibit or prevent leakage of compressible gaseous fuel into the pilot fuel. The reduced pressure differential between the gaseous fuel and the pilot fuel also reduces leakage of pilot fuel into the gaseous fuel.

Existing calibration techniques for natural gas engines employing dual fuel injectors of the type of the '598 patent and diesel as a pilot fuel focus on the calibration of diesel rail pressures required to support emission and fuel usage requirements across the operating range of the engine. One reason for these techniques is integration into the control system of the base diesel engine which operates based on diesel rail pressures. However, in systems that regulate natural gas rail pressure from diesel rail pressure, for example as disclosed in the '833 patent, it has been observed that the pressure differential between the diesel and natural gas rails is not consistent. Unit to unit variations and system aging cause the pressure differential between the pilot fuel and natural gas to change from engine to engine and over time. This causes emission, fuel usage and engine torque targets to vary from what were expected. Since natural gas is the main fuel that determines emissions and fuel usage, when diesel rail pressure is calibrated on a calibration engine, in actual practice the diesel pressure is determined based on the natural gas pressure that meets the emission and fuel usage targets. However, since the pressure differential between the diesel and natural gas rails varies from engine to engine and over time then the natural gas rail pressure will also vary from what it was on the calibration engine. As a result engines tend to operate close to but not at the gas rail pressure within a preferred range of tolerance that meets optimum emission and fuel usage targets.

The present method and apparatus provide an improved technique for controlling fuel pressure in a gaseous fuelled internal combustion engine.

SUMMARY OF THE INVENTION

An improved method for controlling fuel pressure in an internal combustion engine consuming a gaseous fuel and a liquid fuel comprises determining a gaseous fuel pressure target value as a function of an engine operating condition; pressurizing the liquid fuel to a liquid fuel pressure based on the gaseous fuel pressure target value; and regulating gaseous fuel pressure from the liquid fuel pressure; such that the gaseous fuel pressure equals the gaseous fuel pressure target value to within a predetermined range of tolerance. The gaseous fuel can be natural gas, or can be selected from the group consisting of methane, propane, butane, ethane and hydrogen. The liquid fuel can be diesel. The engine operating condition comprises at least one of engine speed, engine torque and base engine fuelling quantity. The gaseous fuel pressure target value is calibrated on a calibration engine to optimize at least one engine parameter, which can be emissions, fuel usage and engine torque, as well as other common engine parameters.

In one aspect, the method further comprises measuring the gaseous fuel pressure; and pressurizing the liquid fuel such that the measured gaseous fuel pressure equals the gaseous fuel pressure target value to within a predetermined range of tolerance.

In another aspect, the method further comprises calculating a liquid fuel pressure target value as a function of the gaseous fuel pressure target value and a nominal pressure differential between the liquid fuel pressure and the gaseous fuel pressure; and pressurizing the liquid fuel such that the liquid fuel pressure equals the liquid fuel pressure target value to within a predetermined range of tolerance. The liquid fuel pressure target value can be stored in a table indexed by the parameters representing the engine operating condition.

In yet another aspect, the method further comprises determining an actual pressure differential between the liquid fuel pressure and the gaseous fuel pressure; and employing the actual pressure differential instead of the nominal pressure differential when calculating the liquid fuel pressure target value. The actual pressure differential can be stored, for example in a memory of an engine controller; and the stored actual pressure differential can be employed instead of the nominal pressure differential when calculating the liquid fuel pressure target value. The gaseous fuel at the gaseous fuel pressure and the liquid fuel at the liquid fuel pressure can be delivered to an injection valve, and the liquid fuel can form a fluid seal for the gaseous fuel within the injection valve. The gaseous fuel pressure target value can be one of a plurality of gaseous fuel pressure target values, and each gaseous fuel pressure target value can be associated with a respective engine operating condition through at least one of a mathematical function parameterized by engine operating conditions and a table indexed by engine operating conditions. The gaseous fuel pressure target value can be determined by interpolating between at least two gaseous fuel pressure target values in the table.

In yet again another aspect, the method further comprises variably regulating the gaseous fuel pressure independently from the liquid fuel pressure; and controlling a pressure differential between the liquid fuel pressure and the gaseous fuel pressure, for example based on engine operating conditions.

In still yet again another aspect, the step of determining the gaseous fuel pressure target value comprises determining a calibrated liquid fuel pressure target value as a function of the engine operating condition, the gaseous fuel pressure target value is equal to a difference between the calibrated liquid fuel pressure target value and a calibrated pressure differential between a liquid fuel calibration pressure and a gaseous fuel calibration pressure to within a predetermined range of tolerance, and in this aspect the method further comprises determining an actual pressure differential between the liquid fuel pressure and the gaseous fuel pressure; calculating an actual liquid fuel pressure target value as a function of the calibrated liquid fuel pressure target value, the calibrated pressure differential and the actual pressure differential, the gaseous fuel pressure target value is equal to a difference between the actual liquid fuel pressure target value and the actual pressure differential to within a predetermined range of tolerance; and pressurizing the liquid fuel such that the liquid fuel pressure equals the actual liquid fuel pressure target value to within a predetermined range of tolerance. The actual pressure differential again can be stored in the memory of the engine controller.

In a further aspect the method comprises determining an actual pressure differential between the liquid fuel pressure and the gaseous fuel pressure; and comparing the actual pressure differential with at least one of a nominal pressure differential and a previously determined actual pressure differential and rejecting the actual pressure differential if it is more than at least one of a predetermined percentage and fixed amount from the nominal pressure differential and the previously determined actual pressure differential.

In still a further aspect the method comprises determining an actual pressure differential between the liquid fuel pressure and the gaseous fuel pressure; comparing the actual pressure differential with a nominal pressure differential; and determining from the comparison at least one of an aging characteristic and a health of at least one of an injection valve, a fuel system of the internal combustion engine and a pressure regulator for regulating the gaseous fuel pressure from the liquid fuel pressure. Similarly, when the actual pressure differential is a first measured pressure differential, the method further comprises comparing a second measured pressure differential with the first measured pressure differential; and determining from the comparison at least one of an aging characteristic and a health of at least one of an injection valve, a fuel system of the internal combustion engine and a pressure regulator for regulating the gaseous fuel pressure from the liquid fuel pressure.

Again, in another aspect the method further comprises determining actual pressure differentials between the liquid fuel pressure and the gaseous fuel pressure as a function of at least one engine operating condition at multiple points in time; and storing the actual pressure differentials. The stored actual pressure differentials from at least one and preferably more than one internal combustion engine can be analyzed to determine at least one of a normal characteristic and a failure characteristic for a pressure regulator. The stored actual pressure differentials can be compared to the failure characteristic of the pressure regulator; and an operator can be warned or the liquid fuel pressure can be reduced or limited when at least a portion of the stored actual pressure differentials matches the failure characteristic to within a predetermined range of tolerance.

An improved apparatus for controlling fuel pressure in an internal combustion engine consuming a gaseous fuel and a liquid fuel comprises a liquid fuel pumping apparatus for pressurizing the liquid fuel from a supply of liquid fuel to a liquid fuel pressure in a liquid fuel rail; a pressure regulator associated with a gaseous fuel line operative to regulate the gaseous fuel from a supply of gaseous fuel to the gaseous fuel line at a gaseous fuel pressure; and an electronic controller programmed to determine a gaseous fuel pressure target value as a function of an engine operating condition; and command the liquid fuel pumping apparatus to pressurize the liquid fuel as a function of the gaseous fuel pressure target value; such that the gaseous fuel pressure equals the gaseous fuel pressure target value to within a predetermined range of tolerance. The liquid fuel pumping apparatus can comprise at least one of a liquid fuel pump and an inlet metering valve connected between the supply of liquid fuel and the liquid fuel pump. The pressure regulator can be a dome-loaded regulator.

In one aspect the apparatus further comprises a gaseous fuel pressure sensor for measuring pressure within the gaseous fuel line, the electronic controller receives signals from the gaseous fuel pressure sensor representative of measured gaseous fuel pressure; the electronic controller is further programmed to regulate liquid fuel flow from the liquid fuel pumping apparatus to reduce differences between the measured gaseous fuel pressure and the gaseous fuel pressure target value.

In another aspect the apparatus further comprises a liquid fuel pressure sensor for measuring pressure within the liquid fuel rail, the electronic controller receives signals from the liquid fuel pressure sensor representative of measured liquid fuel pressure; the electronic controller further programmed to calculate a liquid fuel pressure target value as a function of the gaseous fuel pressure target value and a nominal pressure differential between the liquid fuel pressure and the gaseous fuel pressure; and regulate liquid fuel flow from the liquid fuel pumping apparatus to reduce differences between the measured liquid fuel pressure and the liquid fuel pressure target value. In this aspect the apparatus can further comprise a gaseous fuel pressure sensor for measuring pressure within the gaseous fuel line, the electronic controller receives signals from the gaseous fuel pressure sensor representative of measured gaseous fuel pressure; and the electronic controller is further programmed to calculate an actual pressure differential between the liquid fuel pressure and the gaseous fuel pressure by subtracting the measured gaseous fuel pressure from the measured liquid fuel pressure; and employ the actual pressure differential instead of the nominal pressure differential when calculating the liquid fuel pressure target value.

In yet another aspect, the pressure regulator is a variable pressure regulator and the electronic controller commands the variable pressure regulator to regulate the gaseous fuel pressure thereby controlling a pressure differential between the liquid fuel pressure and the gaseous fuel pressure. The electronic controller can be programmed to adjust the pressure differential based on engine operating conditions.

In yet again another aspect the apparatus further comprises a gaseous fuel pressure sensor for measuring pressure within the gaseous fuel line, the electronic controller receives signals from the gaseous fuel pressure sensor representative of measured gaseous fuel pressure; a liquid fuel pressure sensor for measuring pressure within the liquid fuel rail, the electronic controller receives signals from the liquid fuel pressure sensor representative of the measured liquid fuel pressure; and the electronic controller is further programmed to determine the gaseous fuel pressure target value by determining a calibrated liquid fuel pressure target value as a function of the engine operating condition, the gaseous fuel pressure target value is equal to a difference between the calibrated liquid fuel pressure target value and a calibrated pressure differential between a liquid fuel calibration pressure and a gaseous fuel calibration pressure to within a predetermined range of tolerance; calculate an actual pressure differential between the liquid fuel pressure and the gaseous fuel pressure by subtracting the measured gaseous fuel pressure from the measured liquid fuel pressure; calculate an actual liquid fuel pressure target value as a function of the calibrated liquid fuel pressure target value, the calibrated pressure differential and the actual pressure differential, the gaseous fuel pressure target value is equal to a difference between the actual liquid fuel pressure target value and the actual pressure differential to within a predetermined range of tolerance; and regulate liquid fuel flow from the liquid fuel pumping apparatus to reduce differences between the measured liquid fuel pressure and the actual liquid fuel pressure target value.

In a further aspect, the apparatus further comprises a gaseous fuel pressure sensor for measuring pressure within the gaseous fuel line, the electronic controller receives signals from the gaseous fuel pressure sensor representative of measured gaseous fuel pressure; a liquid fuel pressure sensor for measuring pressure within the liquid fuel rail, the electronic controller receives signals from the liquid fuel pressure sensor representative of measured liquid fuel pressure; and the electronic controller is further programmed to calculate actual pressure differentials between the liquid fuel pressure and the gaseous fuel pressure as a function of at least one engine operating condition at multiple points in time, the actual pressure differentials are calculated by subtracting the measured gaseous fuel pressure from the measured liquid fuel pressure; and store the actual pressure differentials. The electronic controller can be further programmed to store at least one of a normal characteristic and a failure characteristic for the pressure regulator; compare the stored actual pressure differentials to the failure characteristic; and warn an operator or limit the liquid fuel pressure when at least a portion of the stored actual pressure differentials resemble the failure characteristic.

DETAILED DESCRIPTION OF PREFERRED EMBODIMENT(S)

Figure 1:
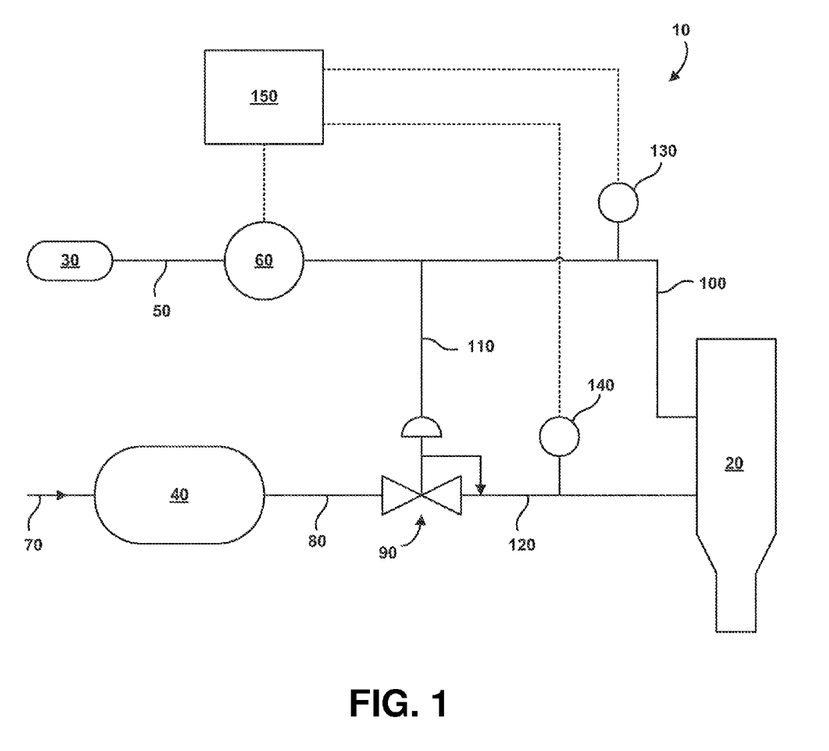
FIG. 1 is a partial schematic view of a fuel system for an internal combustion engine according to one embodiment of the present method and apparatus for controlling fuel pressure in a gaseous fuelled internal combustion engine.

Referring to FIG. 1, there is shown a simplified view of fuel system 10 for supplying a liquid fuel and a gaseous fuel at injection pressure to injection valve 20 in an internal combustion engine (not shown). Injection valve 20 is a dual-fuel injector that introduces the liquid fuel and the gaseous fuel separately and independently directly into a combustion chamber (not shown) of the internal combustion engine. The liquid fuel acts as both a pilot fuel for igniting the fuel mixture inside the combustion chamber and a sealing fluid for sealing the gaseous fuel inside injection valve 20. In the present example the liquid fuel is diesel fuel, but can be other types of liquid fuel that are suitable for compression ignition inside the combustion chamber. The gaseous fuel is the main fuel for combustion in the engine. In the present example the gaseous fuel is natural gas, but can be other types of gaseous fuels which benefit from the ignition assist provided by a liquid fuel that is more easily ignitable from compression heat.

Fuel system 10 comprises a liquid fuel supply 30 and a gaseous fuel supply 40. Liquid fuel supply 30 can be a liquid fuel tank, which supplies the liquid fuel through line 50 to liquid fuel pumping apparatus 60. Gaseous fuel supply 40 is an accumulator in the present embodiment, but in other embodiments supply 40 can be a gas cylinder holding compressed natural gas (CNG). In the present example supply 40 accumulates gaseous fuel from upstream supply line 70, which can be a commercial or residential gas line, or a feed pipe from a supply of liquefied gaseous fuel such as liquefied natural gas (LNG) or liquefied petroleum gas (LPG). In other embodiments a compressor may be required to elevate the pressure of the gaseous fuel above that required for injection by valve 20 into the combustion chamber in the internal combustion engine. Supply 40 provides gaseous fuel to pressure regulator 90 through line 80.

Liquid fuel pumping apparatus 60 pressurizes the liquid fuel to a pressure suitable for injection by injection valve 20 into the combustion chamber. Pumping apparatus 60 comprises a liquid fuel pump in the present embodiment. In other embodiments pumping apparatus 60 can further comprise an inlet metering valve between supply 30 and the liquid fuel pump. Pressurized liquid fuel is delivered to injection valve 20 through liquid fuel rail 100. Although only one injection valve is shown in FIG. 1, it is understood that in most embodiments this injection valve is one of a plurality of injection valves, each associated with a respective combustion chamber, and in such embodiments liquid fuel rail 100 is what is known as a command rail that delivers liquid fuel to all of the injection valves. Pressurized liquid fuel is also delivered to pressure regulator 90 through line 110. Rail 100 and line 110 both receive liquid fuel from pumping apparatus 60. In the present embodiment rail 100 and line 110 are connected to pumping apparatus 60 through a common line, although this is not a requirement. The liquid fuel pressure in rail 100 is equal to the liquid fuel pressure in line 110 to within a predetermined range of tolerance, and preferably these pressures are equal.

Pressure regulator 90 is responsive to liquid fuel pressure in line 110 to regulate gaseous fuel pressure in line 120 below liquid fuel pressure in line 110 and rail 100 by a predetermined amount within a range of tolerance. The operation of regulator 90 is described in further detail in the aforementioned '833 patent. In the present example regulator 90 is a dome-loaded regulator, which is well understood by those familiar with this technology. Injection valve 20 receives gaseous fuel from line 120, and in embodiments with more than one valve 20 all such injection valves receive gaseous fuel from line 120.

Figure 2:
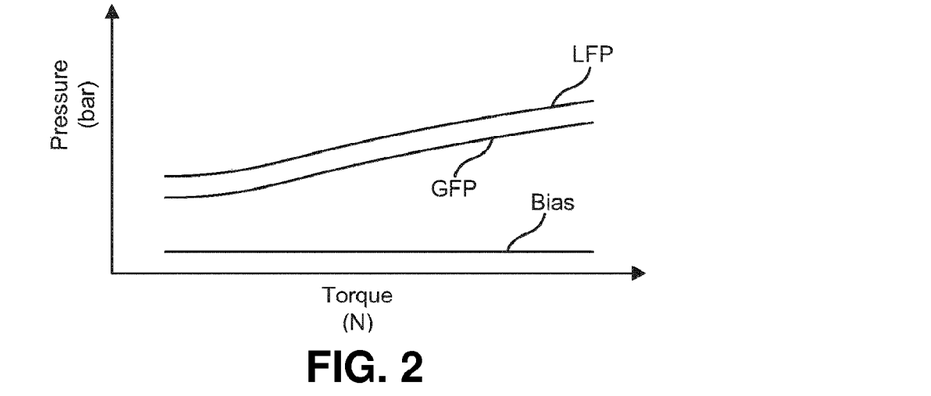
FIG. 2 is a chart illustrating fuel pressure and bias versus engine torque for the internal combustion engine of FIG. 1 operating at one engine speed.

With reference to FIG. 2, the differential pressure between liquid fuel pressure (LFP) in rail 100 and gaseous fuel pressure (GFP) in line 120 is a system characteristic, also called bias and is substantially constant across the operating range of the engine. As seen in FIG. 2, when the liquid and gaseous fuel pressures vary across the range of engine torques the bias remains substantially constant. This relationship is similar across the range of engine speeds. However, the bias can vary due to a number of factors. For example, unit to unit variations in pressure regulator 90 results in different levels of bias from engine to engine.

As the internal combustion engine is operated, the bias can change due to aging of the system. For example, changes to operating characteristics of components in pressure regulator 90 can lead to new or increased internal leakage which contributes to bias drift. Other new or increased leakage that develops in fuel system 10, injection valve 20 and the internal combustion engine further contributes to bias drift. As the liquid fuel pressure is varied across the range of pressures required for operating the internal combustion engine the bias can also drift. In engines where gaseous fuel is the main fuel and the liquid fuel is the pilot fuel it has been learned that, due to the variability of the bias, calibrating gaseous fuel pressure in line 120 for the range of engine operating conditions, instead of calibrating liquid fuel pressure in rail 100, results in emission, torque and/or fuel usage improvements. Improvements in fuel usage results in improvements to fuel economy and fuel consumption. This is in contrast to the industry practice for common rail diesel-cycle engines of calibrating diesel rail pressure (liquid fuel pressure) in rail 100 based on engine operating conditions and then deriving gaseous fuel pressure from the liquid fuel pressure.

In a new calibration technique for common rail diesel-cycle engines employing a liquid pilot fuel and a gaseous main fuel, gaseous fuel pressure target values for line 120 are calibrated for the range of engine operating conditions. In the present example the engine operating conditions comprise the range of engine speeds and engine torques required for operating the engine. However, this is illustrative only and the engine operating conditions can be other measured and determined engine parameters. For example, the diesel fuelling quantity which the base diesel engine would inject into the combustion chamber if the engine was operated only on diesel can be employed as an engine operating condition for which to select the gaseous fuel pressure target values.

Figure 3:
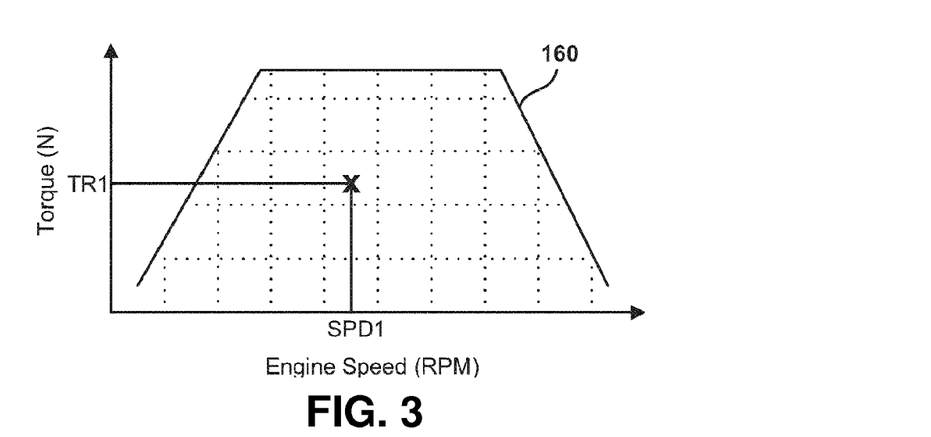
FIG. 3 is a chart illustrating engine torque versus engine speed for the internal combustion engine of FIG. 1.

With reference to FIG. 3, an engine torque-speed chart is shown. Line 160 is a limit line above which the engine should not be operated, and the area under line 160 represents the safe operating region for the engine. As part of the new calibration technique this area is subdivided into sub-regions represented by the dotted lines in FIG. 3. As is understood by those familiar with this technology, the number, size and shape of sub-regions can vary, and those shown in FIG. 3 are for illustrative purposes only. For each sub-region a predetermined engine speed and engine torque value are selected, for example as represented by calibration coordinate (SPD1, TR1), and the gaseous fuel pressure target value is determined for this coordinate such that emissions and/or fuel usage are optimized. The gaseous fuel pressure target value can also be selected to match actual torque with demanded torque.

All the calibration coordinates and target values are tabulated and stored in a calibration table in controller 150. In other embodiments it is possible to perform curve fitting techniques on the calibration coordinates and target values to determine a mathematical function (a formula) which can be employed to calculate the gaseous fuel pressure target value as a function of engine operating conditions. Other engine operating conditions can be employed to determined calibrated gaseous fuel pressure target values. For example, gaseous fuel pressure target values can be calibrated as a function of gas fuelling versus engine speed or liquid fuelling versus engine speed.

Referring back to FIG. 1, fuel system 10 further comprises electronic controller 150 and optional pressure sensors 130 and 140. Electronic controller 150 can comprise both hardware and software components. The hardware components can comprise digital and/or analog components. In the present example electronic controller 150 is a computer comprising a processor and memories, including one or more permanent memories, such as FLASH, EEPROM and a hard disk, and a temporary memory, such as SRAM or DRAM, for storing and executing a program. In another preferred embodiment electronic controller 150 is an engine control unit (ECU) for the engine. As used herein, controller 150 is also referred to as 'the controller'. Pressure sensor 130 measures liquid fuel pressure in common rail 100, and pressure sensor 140 measures gaseous fuel pressure in line 120. Electronic controller 150 is responsive to signals received from pressure sensors 130 and 140 that are representative of their respective pressures to command pumping apparatus 60 to pressurize the liquid fuel accordingly, as will be described in further detail below. At least one of pressure sensors 130 and 140 are required when operating the techniques disclosed herein.

Figure 4:
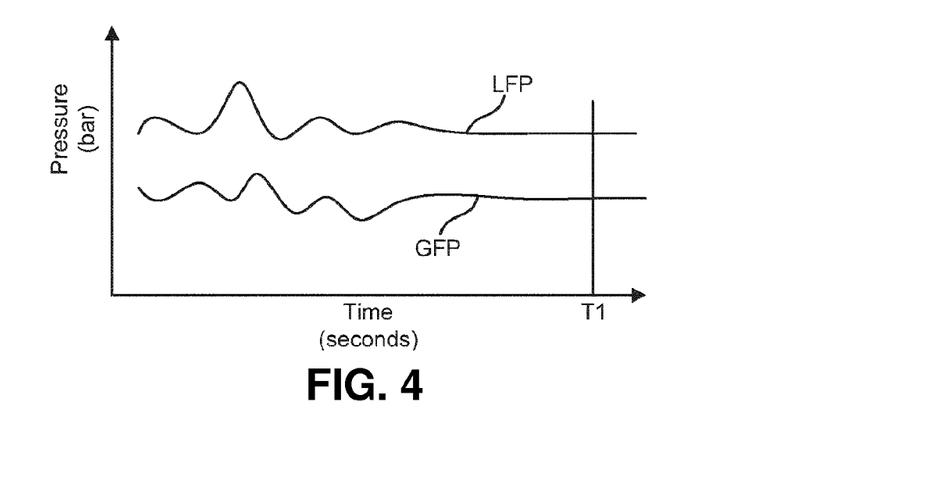
FIG. 4 is a chart illustrating fuel pressure versus time for the fuel system of FIG. 1.

With reference to FIG. 4, the gaseous fuel pressure (GFP) and the liquid fuel pressure (LFP) are preferably measured when the pressures in rail 100 and line 120 have stabilized, for example at time T1. Transient pressure conditions that are present in lines 100, 110 and 120 when the liquid fuel pressure is being changed from one pressure to another can create noise that adversely affects readings from pressure sensors 130 and 140. In addition, the liquid fuel pressure can change at a different rate than the gaseous fuel pressure during transients, which can result in inaccurate bias readings. It is possible that the pressure noise can be filtered using analog and/or digital techniques. The controller preferably uses pressure measurements that are obtained at a stable point such as at time T1, for example when the engine speed and torque have stabilized.

Figure 5:
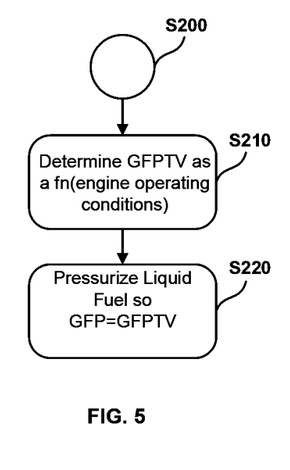
FIG. 5 is flow chart for a fuel pressure control algorithm for the fuel system of FIG. 1 according to a first embodiment.

Referring now to FIG. 5, a technique for controlling fuel pressure in fuel system 10 will now be described according to a first embodiment. The flow chart of FIG. 5 illustrates a control algorithm that is performed by electronic controller 150. The starting point for the algorithm is in step S200 and which is a change in engine operating conditions that requires a change in gaseous fuel pressure in line 120 and liquid fuel pressure in rail 100. In step S210 electronic controller 150 determines a gaseous fuel pressure target value as a function of engine operating conditions. For example, in a preferred embodiment the engine operating conditions employed by controller 150 to determine the target value can be engine speed and engine torque. During step S210 controller 150 determines the gaseous fuel pressure target value for the current engine operating condition by employing a mathematical function to interpolate between the calibrated values in the calibration table. When the current engine operating condition comprises substantially equivalent engine parameter values employed during calibration, controller 150 can perform a look-up function directly to retrieve the target value from the calibration table.

As previously mentioned, in other embodiments the mathematical function can be employed to determine the gaseous fuel pressure target value. In step S220 the controller commands the liquid fuel pumping apparatus 60 to pump liquid fuel from supply 30 to pressurize the liquid fuel in rail 100 and line 110 such that gaseous fuel pressure in line 120 equals the gaseous fuel pressure target value to within a predetermined range of tolerance. The controller monitors the signal received from gaseous fuel pressure sensor 140 to regulate the flow of liquid fuel from pumping apparatus 60 such that the measured gaseous fuel pressure equals the target value. The liquid fuel pressure sensor 130 is not required, but can be used as a safety device for monitoring pressure in rail 100 and line 110 such that the controller can warn an operator or take corrective actions in the event of abnormal liquid fuel pressure. By this method the engine operates at the calibrated gaseous fuel pressures which is the opposite of how prior art engines have been operated when fuelled with directly injected gaseous fuel and liquid fuel where gaseous fuel pressure is a function of a commanded target liquid fuel pressure.

Figure 6:
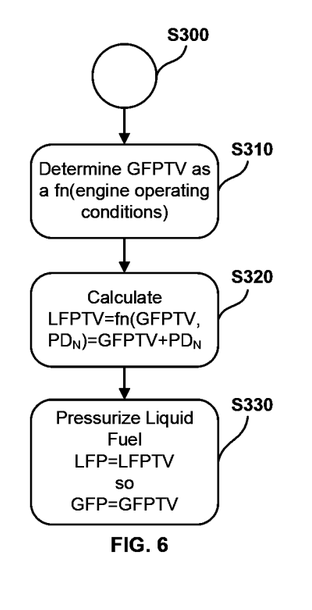
FIG. 6 is flow chart for a fuel pressure control algorithm for the fuel system of FIG. 1 according to a second embodiment.

Referring now to FIG. 6 a second embodiment of the disclosed technique for controlling fuel pressure in fuel system 10 will now be described. This embodiment is similar to the previous embodiment of FIG. 5, and like parts will not be described in detail. The starting point for the algorithm in step S300 is a change in engine operating conditions that requires a change in gaseous fuel pressure in line 120 and liquid fuel pressure in rail 100. In step S310 the controller determines a gaseous fuel pressure target value as a function of engine operating conditions, for example engine speed and engine torque. In step 320 the controller calculates a liquid fuel pressure target value as a function of the gaseous fuel pressure target value and a nominal system characteristic. The nominal system characteristic is a nominal pressure differential (the bias) between liquid fuel pressure in rail 100 and gaseous fuel pressure in line 120 maintained by pressure regulator 90. The nominal pressure differential is an expected value determined empirically or from manufacturer specifications, and is accurate to within a predetermined range of tolerance. Preferably the nominal pressure differential is determined empirically for each pressure regulator 90 such that variations in bias from unit to unit can be taken into account. The liquid fuel pressure target value is a function of the gaseous fuel target value calculated in step S320 by adding the gaseous fuel pressure target value and the nominal pressure differential.

In other embodiments the liquid fuel pressure target value for all engine operating points (the coordinates within the safe operating region shown in FIG. 3) can be calculated beforehand after calibration of the gaseous fuel pressure target values for each engine and its respective pressure regulator 90, and in step S320 the controller retrieves the liquid fuel pressure target value from a look-up table stored in memory accessible by the controller. That is the steps of S310 and S320 can be replaced by a step of looking up the liquid fuel pressure target value based on the engine operating conditions. In step S330 the controller commands the liquid fuel pumping apparatus 60 to pump liquid fuel from supply 30 to pressurize the liquid fuel in rail 100 and line 110 such that liquid fuel pressure in rail 100 equals the liquid fuel pressure target value to within a predetermined range of tolerance. By determining the liquid fuel pressure target value as a function of the gaseous fuel pressure target value and the nominal pressure differential for regulator 90, the controller is commanding pumping apparatus 60 based on the gaseous fuel pressure target value. The controller monitors the signal received from liquid fuel pressure sensor 130 to regulate the flow of liquid fuel from pumping apparatus 60 such that measured liquid fuel pressure equals the liquid fuel pressure target value to within a predetermined range of tolerance. The gaseous fuel pressure sensor 140 is not required, but can be used as a safety device for monitoring pressure in line 120 such that the controller can warn an operator or take corrective actions in the event of abnormal gaseous fuel pressure.

Figure 7:
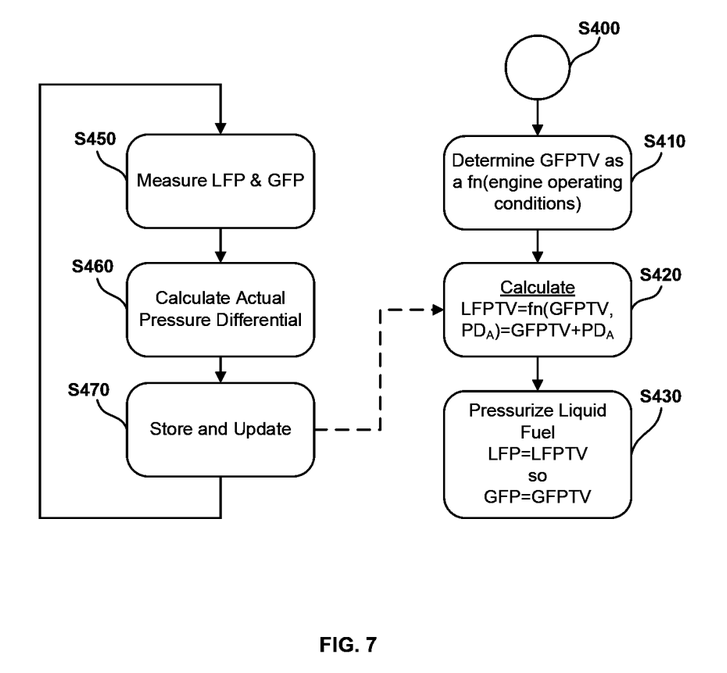
FIG. 7 is flow chart for a fuel pressure control algorithm for the fuel system of FIG. 1 according to a third embodiment.

Referring now to FIG. 7 a third embodiment of the disclosed technique for controlling fuel pressure in fuel system 10 will now be described. This embodiment is similar to the previous embodiment of FIG. 6, and like parts will not be described in detail if at all. Steps S400, S410 and S430 are the same as previous steps S300, S310 and S330 respectively and are not discussed. After determining the gaseous fuel pressure target value as a function of engine operating conditions in step S410, the controller calculates the liquid fuel pressure target value as a function of the gaseous fuel pressure target value and an actual pressure differential in step S420. In the previous embodiment of FIG. 6 unit to unit variation in bias for pressure regulator 90 was accounted for by empirically determining the nominal pressure differential for each pressure regulator 90. However, as the engine is operated and the system ages the actual pressure differential can vary from the nominal pressure differential.

The actual pressure differential is determined in steps S450 through S470. In step S450 the controller measures the liquid fuel pressure in rail 100 and the gaseous fuel pressure in line 120 by receiving corresponding signals representative of these pressures from sensors 130 and 140. The actual pressure differential is calculated in step S460 by subtracting the measured gaseous fuel pressure from the measured liquid fuel pressure. In this step the controller can reject the measured actual liquid fuel pressure differential if it is more than a predetermined percentage or fixed amount from the nominal pressure differential or a previously measured actual pressure differential such that erroneous readings can be filtered out. For example, it is expected that the actual pressure differential does not vary greatly in value from the nominal pressure differential, and any measured actual pressure differential can be discarded if it is uncharacteristically different in value from the nominal pressure differential or a previously measured actual pressure differential which could be indicative of noise which is present during a transient condition. It is important to emphasize that even modest changes in the actual pressure differential value can adversely influence emission and fuel usage targets for the engine if this change is not accounted for while pressurizing rail 120. In step S470 the controller stores the actual pressure differential in a memory along with the corresponding engine operating conditions. Other metadata associated with the actual pressure differential and/or the engine operating conditions can also be stored. For example, a timestamp of when the actual pressure differential was calculated can be stored along with other engine parameters. In a preferred embodiment the controller stores the actual pressure differential at least each time its current value changes. Preferably, when storing a new actual pressure differential the controller does not overwrite the previously stored value such that a history of actual pressure differentials can be obtained. The controller employs the current actual pressure differential when calculating the liquid fuel pressure target value in step S420.

The history of stored actual pressure differentials (bias history) from one or more internal combustion engines can be analyzed to determine a normal characteristic and a failure characteristic for the bias. These characteristics can be used to determine whether pressure regulator 90 is operating within manufacturer's specifications or not, and can be used to proactively recognize or predict when the regulator needs to be serviced or replaced before it fails. The bias histories can be obtained from engines operating in a controlled test cell environment or can be obtained from engines operating when in service in the field. In the test cell environment accelerated testing can be done until pressure regulator 90 fails, or known faulty or adapted pressure regulators 90 can be used to obtain bias failure data. The bias histories can also be obtained from engines in the field while they are being serviced or when deployed by telemetry.

Figure 8:
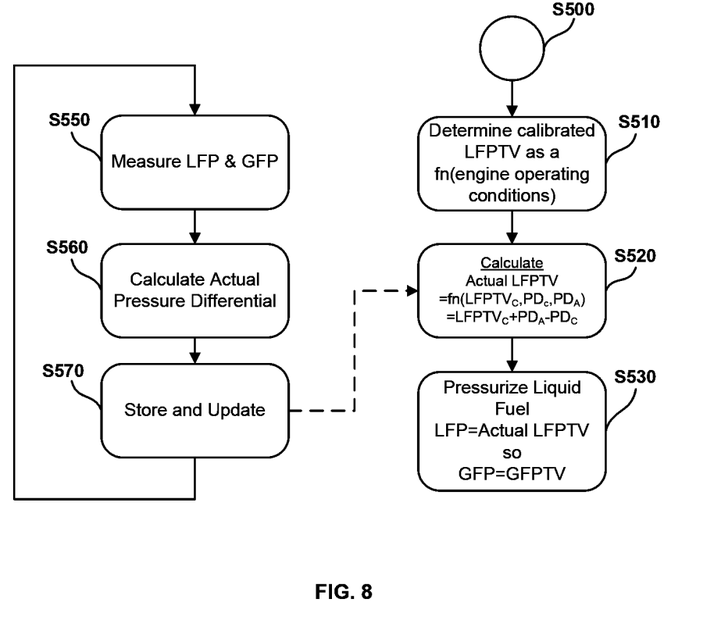
FIG. 8 is a flow chart for a fuel pressure control algorithm for the fuel system of FIG. 1 according to a fourth embodiment.

Referring now to FIG. 8 a fourth embodiment of the disclosed technique for controlling fuel pressure in fuel system 10 will now be described. This embodiment is similar to the previous embodiment of FIG. 7, and like parts will not be described in detail if at all. Steps S500, S550, S560 and S570 are the same as previous steps S400, S450, S460 and S470 respectively and are not discussed. As in the previous embodiments, for each engine operating condition the engine is operated at respective gaseous fuel pressure target values to within a predetermined range of tolerance. In the present embodiment the manner by which the engine operates at a particular gaseous fuel pressure target value is by way of adjusting a calibrated liquid fuel pressure target value based on a difference between an actual pressure differential and a calibrated pressure differential. In step S510, in response to a change in engine operating conditions, the controller determines the calibrated liquid fuel pressure target value as a function of engine operating conditions, for example engine speed and engine torque. As illustrated in eqn. 1, the calibrated liquid fuel pressure target value ($LFPTV_C$) is equal to the gaseous fuel pressure target value (GFPTV), as calibrated on the calibration engine for the engine operating conditions, plus the calibrated pressure differential ($PD_C$) between the liquid fuel pressure and the gaseous fuel pressure on the calibration engine. In the present embodiment, as in previous embodiments, the objective is to operate at the gaseous fuel pressure target value for respective engine operating conditions, which is different from prior art techniques which operate at a liquid fuel pressure target value without any correction for the actual pressure differential which results in drifting away from operating at the gaseous fuel pressure target value.

$$LFPTV_C = GFPTV + PD_C \qquad \text{eqn. 1}$$

For the current embodiment a new calibration technique is employed that is similar to the existing calibration techniques discussed previously in the background and includes a new step, which is described below, that is different from the existing techniques. As is already performed in the existing techniques, during calibration the calibrated liquid fuel pressure target values that optimize engine parameters such as at least one of emissions and fuel usage are recorded for the range of engine operating conditions. Different from existing techniques, the new step comprises recording the calibrated pressure differential between the liquid fuel pressure and the gaseous fuel pressure on the calibration engine. The calibrated liquid fuel pressure target values and the calibrated pressure differential together define the gaseous fuel pressure target values that provided optimum operating parameters for the range of engine operating conditions on the calibration engine. A table or mathematical function that defines the calibrated liquid fuel pressure target values as a function of engine operating conditions is compiled and stored in controller 150 along with the calibrated pressure differential which can also be defined as a function of engine operating conditions. For example, the calibrated pressure differential on the calibration engine can be measured before, during and after calibration to determine whether any deviation in its value has occurred, or the actual pressure differential on the calibration engine can be determined and recorded for each engine operating condition for which calibration is performed. The calibrated pressure differential on the calibration engine should not vary significantly before, during and after calibration.

Returning to step S510, by determining the calibrated liquid fuel pressure target value and having knowledge of the calibrated pressure differential on the calibration engine, in effect the gaseous fuel pressure target value that optimized an engine parameter on the calibration engine for the current engine operating condition is known. However, the actual pressure differential changes from engine to engine, and in these other engines knowing the calibrated liquid fuel pressure target value and the calibrated pressure differential does not provide enough information to operate these engines at the gaseous fuel pressure target value to within a predetermined range of tolerance. In step S520 the controller calculates an actual liquid fuel pressure target value as a function of the calibrated liquid fuel pressure target value, the calibrated pressure differential on the calibration engine and the actual pressure differential on the present engine received from step S570. As illustrated in eqn. 2, the actual liquid fuel pressure target value ($LFPTV_A$) is equal to the calibrated liquid fuel pressure target value ($LFPTV_C$) plus the difference between the actual pressure differential ($PD_A$) on the present engine and the calibrated pressure differential ($PD_C$) on the calibration engine.

$$LFPTV_A = LFPTV_C + (PD_A - PD_C) \qquad \text{eqn. 2}$$

The actual liquid fuel pressure target value represents what the pressure in rail 100 should be such that line 120 operates at the gaseous fuel pressure target value as determined on the calibration engine for the current engine operating condition. The actual liquid fuel pressure target value takes the actual bias into consideration on the present engine. Eqn. 3 illustrates that the gaseous fuel pressure target value is equal to the actual liquid fuel pressure target value minus the actual pressure differential, which is obtained by substituting eqn. 1 into eqn. 2 and solving for GFPTV.

$$GFPTV = LFPTV_A - PD_A \qquad \text{eqn. 3}$$

In step S530 the controller commands the liquid fuel pumping apparatus 60 to pump liquid fuel from supply 30 to pressurize the liquid fuel in rail 100 and line 110 such that liquid fuel pressure in rail 100 equals the actual liquid fuel pressure target value to within a predetermined range of tolerance. By determining the actual liquid fuel pressure target value as a function of the calibrated liquid fuel pressure target value, the calibrated pressure differential on the calibration engine and the actual pressure differential on the present engine, the controller is commanding pumping apparatus 60 based on the gaseous fuel pressure target value that meets the emission and/or fuel usage targets. The controller monitors the signal received from liquid fuel pressure sensor 130 to regulate the flow of liquid fuel from pumping apparatus 60 such that measured liquid fuel pressure equals the actual liquid fuel pressure target value to within a predetermined range of tolerance.

Figure 9:
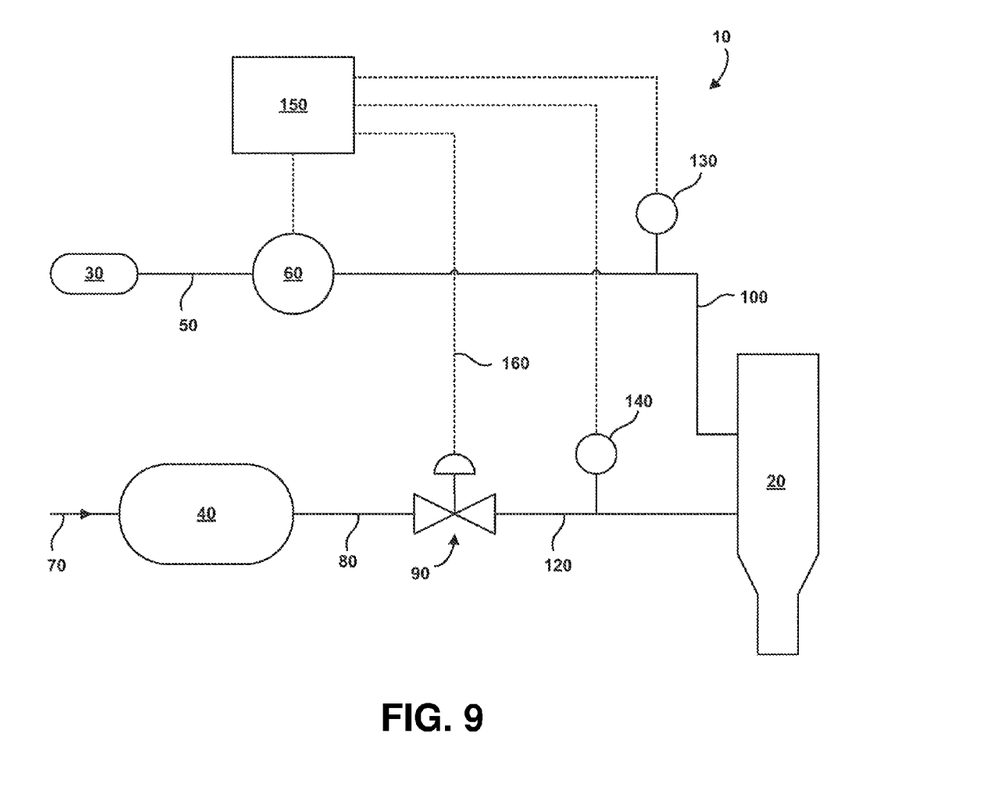
FIG. 9 a partial schematic view of a fuel system for an internal combustion engine according to a second embodiment of the present method and apparatus for controlling fuel pressure in a gaseous fuelled internal combustion engine.

Referring now to FIG. 9, there is shown a simplified view of another embodiment of fuel system 10 for supplying liquid fuel and gaseous fuel at injection pressure to injection valve 20. This embodiment is similar to the embodiment of FIG. 1 and only the differences are discussed. Pressure regulator 90 is a variable pressure regulator that is controllable by controller 150 to adjustably regulate the gaseous fuel pressure in line 120. In this embodiment regulator 90 is not directly responsive to liquid fuel pressure. The controller monitors the pressure signals from sensors 130 and 140 and commands pumping apparatus 60 and pressure regulator 90 such that a target pressure differential between rail 100 and line 120 is maintained to within a predetermined range of tolerance. In existing techniques, which employ a dome loaded regulator for pressure regulator 90, the pressure differential between the liquid fuel and the gaseous fuel is selected by the minimum required to ensure no gaseous fuel leaks to a liquid fuel drain line (not shown) to within a predetermined range of tolerance, and is set by the worst case condition such as a high fuel flow operating point like peak power. That is, the pressure differential between the liquid fuel and the gaseous fuel is selected to reduce and preferably minimize leakage of gaseous fuel to the liquid fuel drain line that returns liquid fuel from injection valve 20 to supply 30.

Excessively increasing the pressure differential causes liquid fuel to leak into gaseous fuel and can detrimentally change needle motion in injection valve 20. It is preferable to reduce the pressure differential during lower load operating points other than peak power such that both gaseous fuel leak to drain is reduced and preferably minimized and liquid fuel leak into gaseous fuel is reduced and preferably minimized. That is, an optimum pressure differential is preferred at each engine operating condition. Controller 150 can adjust the pressure differential as a function of engine operating conditions to optimize the performance of the fluid seal in injection valve 20 by reducing bias at idle and lower load conditions and progressively increasing bias at higher load conditions. When pressure regulator 90 is a dome loaded regulator, as in existing fuel systems discussed in the previously discussed '833 patent, the liquid fuel pressure can change at a different rate than the gaseous fuel pressure during transients. The present embodiment has the advantage of independently controlling the liquid fuel pressure from the gaseous fuel pressure such that a desired pressure differential, to reduce and preferably minimize fuel leakage in injection valve 20, can be maintained during transients.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for controlling fuel pressure in an internal combustion engine consuming a gaseous fuel and a liquid fuel comprising:
   determining a gaseous fuel pressure target value as a function of an engine operating condition;
   calculating a liquid fuel pressure target value as a function of said gaseous fuel pressure target value and at least one of a nominal pressure differential between said liquid fuel pressure and said gaseous fuel pressure and an actual pressure differential between a measured liquid fuel pressure and a measured gaseous fuel pressure;
   pressurizing said liquid fuel to said calculated liquid fuel pressure target value to within a predetermined range of tolerance; and
   regulating gaseous fuel pressure from said liquid fuel pressure; wherein said gaseous fuel pressure equals said gaseous fuel pressure target value to within a predetermined range of tolerance.

2. The method of claim 1, wherein said liquid fuel pressure target value is stored in a table indexed by said engine operating condition.

3. The method of claim 1, further comprising:
   storing said actual pressure differential; and
   employing said stored actual pressure differential when calculating said liquid fuel pressure target value.

4. The method of claim 1, further comprising:
   comparing said actual pressure differential with at least one of a nominal pressure differential and a previously determined actual pressure differential and rejecting said actual pressure differential if it is more than at least one of a predetermined percentage and fixed amount from said nominal pressure differential and said previously determined actual pressure differential.

5. The method of claim 4, further comprising:
comparing said actual pressure differential with a nominal pressure differential; and
determining from said comparison at least one of an aging characteristic and a health of at least one of an injection valve, a fuel system of said internal combustion engine, and a pressure regulator for regulating said gaseous fuel pressure from said liquid fuel pressure.

6. The method of claim 1, wherein said actual pressure differential is a first measured pressure differential, the method further comprising:
comparing a second measured pressure differential with said first measured pressure differential; and
determining from said comparison at least one of an aging characteristic and a health of at least one of an injection valve, a fuel system of said internal combustion engine, and a pressure regulator for regulating said gaseous fuel pressure from said liquid fuel pressure.

7. The method of claim 1, further comprising:
determining actual pressure differentials between a measured liquid fuel pressure and a measured gaseous fuel pressure as a function of at least one engine operating condition at multiple points in time; and
storing said actual pressure differentials.

8. The method of claim 7, further comprising:
analyzing said stored actual pressure differentials to determine at least one of a normal characteristic and a failure characteristic for a pressure regulator.

9. The method of claim 8, wherein said stored actual pressure differentials from a plurality of internal combustion engines are analyzed to determine said normal characteristic and said failure characteristic.

10. The method of claim 7, further comprising:
comparing said stored actual pressure differentials to a failure characteristic of a pressure regulator; and
warning an operator or limiting said liquid fuel pressure when at least a portion of said stored actual pressure differentials match said failure characteristic to within a predetermined range of tolerance.

11. The method of claim 1, wherein said gaseous fuel is selected from the group consisting of methane, natural gas, propane, butane, ethane and hydrogen.

12. A method for controlling fuel pressure in an internal combustion engine consuming a gaseous fuel and a liquid fuel comprising:
determining a gaseous fuel pressure target value as a function of a calibrated liquid fuel pressure target value as a function of an engine operating condition, said gaseous fuel pressure target value equal to a difference between said calibrated liquid fuel pressure target value and a calibrated pressure differential between a liquid fuel calibration pressure and a gaseous fuel calibration pressure to within a predetermined range of tolerance;
determining an actual pressure differential between a measured liquid fuel pressure and a measured gaseous fuel pressure;
calculating an actual liquid fuel pressure target value as a function of said calibrated liquid fuel pressure target value, said calibrated pressure differential and said actual pressure differential, said gaseous fuel pressure target value equal to a difference between said actual liquid fuel pressure target value and said actual pressure differential to within a predetermined range of tolerance;
pressurizing said liquid fuel such that said liquid fuel pressure equals said actual liquid fuel pressure target value to within a predetermined range of tolerance; and
regulating gaseous fuel pressure from said liquid fuel pressure; wherein said gaseous fuel pressure equals said gaseous fuel pressure target value to within a predetermined range of tolerance.

13. The method of claim 12, wherein said actual pressure differential is stored.

14. An apparatus for controlling fuel pressure in an internal combustion engine consuming a gaseous fuel and a liquid fuel comprising:
a liquid fuel pumping apparatus for pressurizing said liquid fuel from a supply of liquid fuel to a liquid fuel pressure in a liquid fuel rail;
a liquid fuel pressure sensor for measuring pressure within said liquid fuel rail;
a pressure regulator associated with a gaseous fuel line responsive to said liquid fuel pressure to regulate said gaseous fuel from a supply of gaseous fuel to said gaseous fuel line at a gaseous fuel pressure;
a gaseous fuel pressure sensor for measuring pressure within said gaseous fuel line; and
an electronic controller receiving signals from said liquid fuel pressure sensor representative of measured liquid fuel pressure and receiving signals from said gaseous fuel pressure sensor representative of measured gaseous fuel pressure, said electronic controller programmed to:
calculate an actual pressure differential between said liquid fuel pressure and said gaseous fuel pressure by subtracting said measured gaseous fuel pressure from said measured liquid fuel pressure;
determine a gaseous fuel pressure target value as a function of an engine operating condition;
calculate a liquid fuel pressure target value as a function of said gaseous fuel pressure target value and said actual pressure differential between said liquid fuel pressure and said gaseous fuel pressure; and
command said liquid fuel pumping apparatus to pressurize said liquid fuel to said liquid fuel pressure target value; wherein said gaseous fuel pressure equals said gaseous fuel pressure target value to within a predetermined range of tolerance.

15. The apparatus of claim 14, wherein said electronic controller is further programmed to:
determine said gaseous fuel pressure target value by determining a calibrated liquid fuel pressure target value as a function of said engine operating condition, said gaseous fuel pressure target value equal to a difference between said calibrated liquid fuel pressure target value and a calibrated pressure differential between a liquid fuel calibration pressure and a gaseous fuel calibration pressure to within a predetermined range of tolerance;
calculate an actual liquid fuel pressure target value as a function of said calibrated liquid fuel pressure target value, said calibrated pressure differential and said actual pressure differential, said gaseous fuel pressure target value equal to a difference between said actual liquid fuel pressure target value and said actual pressure differential to within a predetermined range of tolerance; and
regulate liquid fuel flow from said liquid fuel pumping apparatus such that said measured liquid fuel pressure equals said actual liquid fuel pressure target value to within a predetermined range of tolerance.

16. The apparatus of claim 14, wherein said electronic controller is further programmed to store actual pressure differentials from multiple points in time.

17. The apparatus of claim 16, wherein said electronic controller is further programmed to:
- store at least one of a normal characteristic and a failure characteristic for said pressure regulator:
- compare said stored actual pressure differentials to said failure characteristic; and
- warn an operator or limit said liquid fuel pressure when at least a portion of said stored actual pressure differentials resemble said failure characteristic.

* * * * *